UNITED STATES PATENT OFFICE.

COURTNEY CONOVER, OF PHILADELPHIA, PENNSYLVANIA, AND HARRY D. GIBBS, OF SAN FRANCISCO, CALIFORNIA; SAID CONOVER ASSIGNOR TO JAMES M. SELDEN, OF PITTSBURGH, PENNSYLVANIA.

PROCESS FOR THE MANUFACTURE OF ANTHRAQUINONE.

1,417,367. Specification of Letters Patent. Patented May 23, 1922.

No Drawing. Application filed June 7, 1917. Serial No. 173,404.

(FILED UNDER THE ACT OF MARCH 3, 1883, 22 STAT. L., 625.)

*To all whom it may concern:*

Be it known that we, COURTNEY CONOVER and HARRY D. GIBBS, citizens of the United States of America and employees of the Department of Agriculture, residing in the city of Philadelphia, county of Philadelphia, State of Pennsylvania, and in the city of San Francisco, county of San Francisco, State of California, respectively, (whose post-office address is Washington, District of Columbia,) have invented a new and useful Process for the Manufacture of Anthraquinone.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty.

Our invention relates to a process for the manufacture of anthraquinone from anthracene.

It is well known that anthraquinone is commonly produced by the oxidation of anthracene in an extremely fine state of division by means of chromic acid. In this process the reduction of the anthracene to the fine state of division is difficult and expensive, and further the chromic acid subsequently used for oxidation is a costly reagent. The object of our invention is to provide a process for the manufacture of anthraquinone which will be free from the objectionable features of the processes employed at present.

Our invention consists in the production of anthraquinone from anthracene by heating the anthracene until it passes into the vapor phase, mixing this anthracene vapor with an oxygen-containing gas mixture, forcing this mixture of gases into close contact with finely divided oxides of vanadium, heated to a temperature ranging from 250° C. to 650° C., under which treatment the anthracene is partially oxidized to form the valuable product named.

To illustrate the practical operation of our process we shall describe in detail the preferred procedure. Anthracene is melted and is caused to flow continuously at a measured rate into a heated chamber where it is volatilized. This vapor of anthracene is then mixed with air in excess of the proportion theoretically required to oxidize anthracene to anthraquinone. The mixture of air and anthracene vapor is passed into a reaction chamber maintained at a temperature ranging from 350° to 550° C., the preferred temperature being 500° C. In this chamber the gas mixture is forced into close contact with oxides of vanadium in the form of a fine powder. This powder is supported on trays or on a porous material where, by mechanical means the current of mixed gases is forced through it. The gases are kept under pressure only sufficient to cause them to flow continuously through the reaction chamber. The product of the reaction, together with unchanged anthracene, are condensed, and the anthraquinone is separated from the unchanged anthracene and other substances, if any, by well-known processes.

We have discovered that the process as above described may be varied in many ways and yet will produce anthraquinone. Thus, oxygen may be substituted wholly or in part for air, or air may be mixed with a gas which is relatively inert under the conditions obtaining in the process. The oxides of vanadium may be mixed with or combined with other substances, such as other metallic oxides, or with asbestos, pumice stone, or other materials. The gas mixture may be brought in contact with or forced through the catalyst in many different ways. The proportion of anthracene vapor to the oxygen-containing gas mixture may be varied within wide limits. Materials containing anthracene, together with the substances commonly associated with it may be used instead of pure anthracene. And the reaction products may be separated by various well-known means.

Having thus described our invention, we claim—

1. The method of oxidizing anthracene, which comprises subjecting anthracene in the vapor phase to oxidation by oxygen in the presence of an oxid of vanadium as a catalyzer, at a temperature of about 300° C. to 500° C.

2. The method of oxidizing anthracene, which comprises passing a mixture of anthracene in the vapor phase, and an oxygen containing gas into contact with an oxid of vanadium as a catalyzer heated to a temperature of about 300° C. to 500° C. whereby anthraquinone is produced.

In testimony whereof, we affix our signatures in the presence of two subscribing witnesses.

COURTNEY CONOVER.
HARRY D. GIBBS.

Witnesses:
PHILIP L. GOWEN,
R. R. WILLIAMS.